(12) United States Patent
Greeff

(10) Patent No.: US 8,031,053 B2
(45) Date of Patent: Oct. 4, 2011

(54) RFID LABEL TIME SYNCHRONIZATION

(75) Inventor: Roy Edgar Greeff, Boise, ID (US)

(73) Assignee: Round Rock Research, LLC, Mt. Kisco, NY (US)

( * ) Notice: Subject to any disclaimer, the term of this patent is extended or adjusted under 35 U.S.C. 154(b) by 1012 days.

(21) Appl. No.: 11/924,799

(22) Filed: Oct. 26, 2007

(65) Prior Publication Data

US 2009/0109041 A1    Apr. 30, 2009

(51) Int. Cl.
H04Q 5/22 (2006.01)
(52) U.S. Cl. .............. 340/10.1; 340/870.01; 340/870.17
(58) Field of Classification Search ................. 340/10.1
See application file for complete search history.

(56) References Cited

U.S. PATENT DOCUMENTS

| | | | | |
|---|---|---|---|---|
| 6,002,344 A * | 12/1999 | Bandy et al. | ................. | 340/10.2 |
| 6,097,306 A * | 8/2000 | Leon et al. | ..................... | 340/5.1 |
| 7,460,012 B2 * | 12/2008 | Ii | ................. | 340/539.1 |
| 7,599,671 B2 * | 10/2009 | Kopikare et al. | ............ | 455/130 |
| 7,782,204 B2 * | 8/2010 | Sato | ............ | 340/572.1 |
| 2002/0053985 A1 * | 5/2002 | Nesbitt | ......... | 340/994 |
| 2005/0218950 A1 * | 10/2005 | Kamei | .......... | 327/205 |
| 2006/0170565 A1 * | 8/2006 | Husak et al. | ............ | 340/825.49 |
| 2007/0096984 A1 * | 5/2007 | Leitch et al. | ................. | 342/453 |
| 2008/0294384 A1 * | 11/2008 | Fok et al. | ..................... | 702/187 |
| 2009/0128292 A1 | 5/2009 | Greeff | | |

OTHER PUBLICATIONS

USPTO Transaction History of related U.S. Appl. No. 11/942,353, filed Nov. 19, 2007, entitled "RFID Device Time Synchronization From a Public Source."
USPTO Transaction History of U.S. Appl. No. 11/942,353, filed Nov. 19, 2007, entitled "RFID Device Time Synchronization From a Public Source."
Greeff, Roy, U.S. Appl. No. 11/942,353; "RFID Label Time Synchronization", filed Nov. 19, 2007.

* cited by examiner

Primary Examiner — Brent Swarthout
Assistant Examiner — Naomi Small
(74) Attorney, Agent, or Firm — Lerner, David, Littenberg, Krumholz & Mentlik, LLP

(57) ABSTRACT

Methods and apparatus, including computer program products, for radio frequency identification (RFID) label time synchronization. A method includes, in a radio frequency identification (RFID) interrogator having an antenna, transceiver, a clock, a memory and a central processing unit (CPU), initializing a RFID tag with a label start time and a time to record data, the label start time representing an actual start time indicated by the clock, receiving a label stop time, a label time and logged data from an interrogation of the RFID tag, and compensating the label time for a drift between the label stop time and an actual stop time.

17 Claims, 3 Drawing Sheets

RFID LABEL TIME SYNCHRONIZATION

BACKGROUND

The present invention relates to radio frequency identification (RFID), and more particularly to RFID label time synchronization.

RFID is a technology that incorporates the use of electromagnetic or electrostatic coupling in the radio frequency (RF) portion of the electromagnetic spectrum to uniquely identify an object, animal, or person. With RFID, the electromagnetic or electrostatic coupling in the RF (radio frequency) portion of the electromagnetic spectrum is used to transmit signals. A typical RFID system includes an antenna and a transceiver, which reads the radio frequency and transfers the information to a processing device (reader) and a transponder, or RF label, which contains the RF circuitry and information to be transmitted. The antenna enables the integrated circuit to transmit its information to the reader that converts the radio waves reflected back from the RFID label into digital information that can then be passed on to computers that can analyze the data.

SUMMARY

The present invention provides methods and apparatus, including computer program products, for RFID label time synchronization.

In general, in one aspect, the invention features a method including, in a radio frequency identification (RFID) interrogator having an antenna, transceiver, a clock, a memory and a central processing unit (CPU), initializing a RFID tag with a label start time and a time to record data, the label start time representing an actual start time indicated by the clock, receiving a label stop time, a label time and logged data from an interrogation of the RFID tag, and compensating the label time for a drift between the label stop time and an actual stop time.

In embodiments, compensating can include determining an actual time associated with the logged data. Determining the actual time can include determining a product of the label time and a difference between the actual stop time and the actual start time, and determining a quotient of the product and a difference between the label stop time and label start time.

The data can be a temperature, humidity and/or a pressure.

In embodiments, the method can include receiving a subsequent label stop time, a subsequent label time and subsequent logged data from a subsequent interrogation of the RFID tag, and compensating the subsequent label time for a drift between the subsequent label stop time and the actual stop time.

The method can include receiving additional label times and logged data from the interrogation of the RFID tag, and compensating each of the additional label times for a drift between the label stop time and an actual stop time.

In another aspect, the invention features a radio frequency identification (RFID) interrogator including an antenna linked to a transceiver, and a programmable memory and central processing unit linked to the transceiver, memory programmed to adjust times in an interrogated RFID label in which data including time is logged.

In embodiments, the programming can include initializing a RFID tag with a label start time and a time to record data, the label start time representing an actual start time indicated by the clock, receiving a label stop time, a label time and logged data from an interrogation of the RFID tag, and compensating the label time for a drift between the label stop time and an actual stop time, compensating including determining an actual time associated with the logged data.

Determining the actual time can include determining a product of the label time and a difference between the actual stop time and the actual start time, and determining a quotient of the product and a difference between the label stop time and label start time.

The data can be a temperature, humidity and/or a pressure.

In embodiments, the programming can include receiving a subsequent label stop time, a subsequent label time and subsequent logged data from a subsequent interrogation of the RFID tag, and compensating the subsequent label time for a drift between the subsequent label stop time and the actual stop time.

The programming can include receiving additional label times and logged data from the interrogation of the RFID tag, and compensating each of the additional label times for a drift between the label stop time and an actual stop time.

The invention can be implemented to realize one or more of the following advantages.

A time is stored in a RFID label at a point A in time and again at a point B in time. The RFID label logs time and other data between points A and B, and to whatever extent a clock in the RFID label drifts, it is accommodated by synchronizing the time over the actual number of readings taken.

One implementation of the invention provides all of the above advantages.

Other features and advantages of the invention are apparent from the following description, and from the claims.

BRIEF DESCRIPTION OF THE DRAWINGS

Like reference numbers and designations in the various drawings indicate like elements.

DETAILED DESCRIPTION

Radio frequency identification (RFID) labels can be intelligent or just respond with a simple identification (ID) to radio frequency (RF) interrogations. The RFID label can contain memory. This memory can be loaded with data either via an interrogator, or directly by some integrated data gathering element of the RFID label, for example, an environmental sensor. This data is retrieved some time later.

Figure 1:
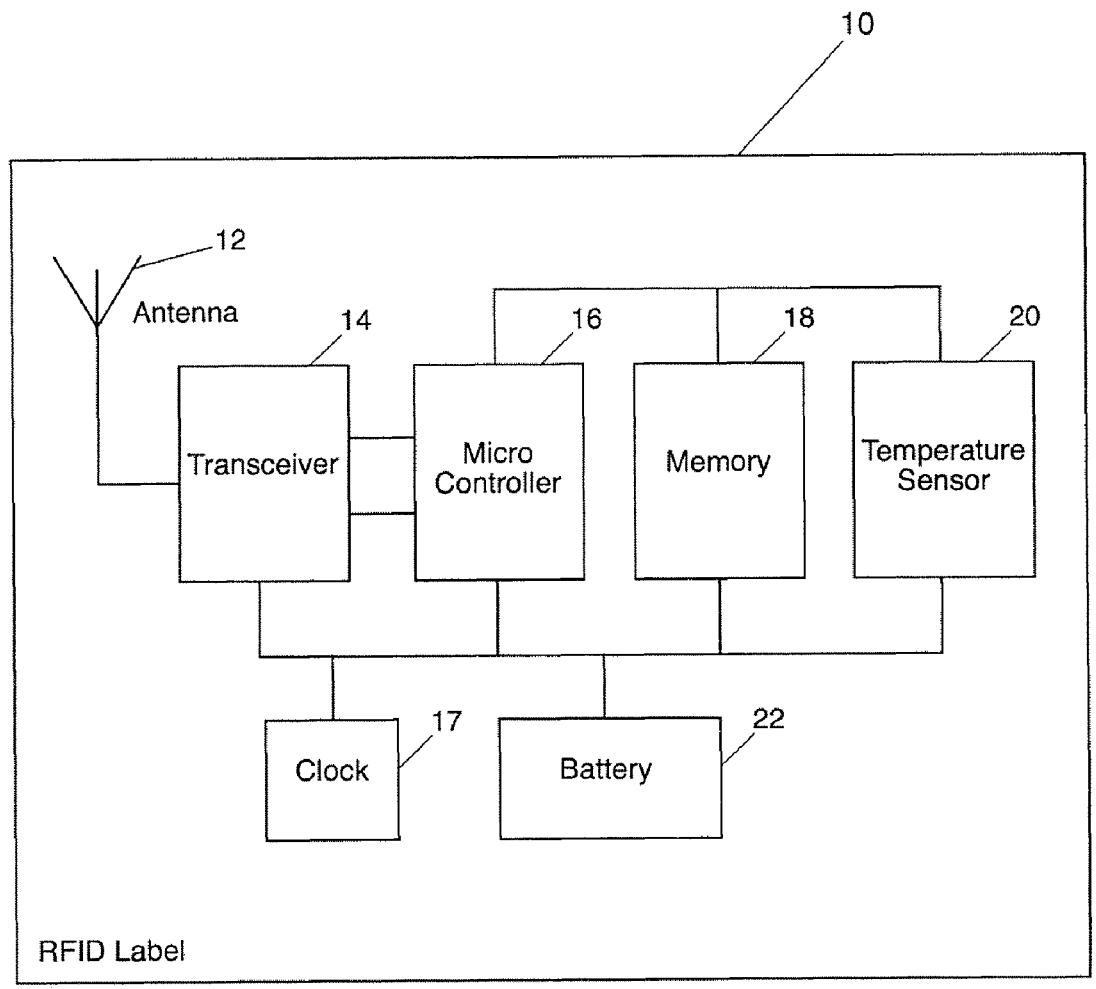
FIG. 1 is a block diagram of an exemplary radio frequency identification (RFID) label.

As shown in FIG. 1, an exemplary RFID label 10 includes an antenna 12, transceiver 14, microcontroller 16, clock 17, memory 18, temperature sensor 20 and battery 22. Other RFID labels may include one or more other data detecting devices in place of, or in addition to, the temperature sensor 20. The label 10 can include other data detecting devices that record other data such as, for example, pressure, humidity and so forth. In this example, the data detecting device is the temperature sensor 20, which senses and transmits a time and temperature to memory 18 at a time programmed by an interrogator. When triggered by RF interrogation via transceiver 14, microcontroller 16 fetches data (i.e. temperature and time the temperature was recorded, along with the current time in the label 10) from memory 18 and sends it out to the interrogator as multiplexed data packets from transceiver 14. In this manner, a historical temperature log stored in memory 18 in the RFID label 10 can be retrieved. Data logging, such as temperature logging, is limited by the size of memory 18 and/or life of battery 22.

Figure 2:
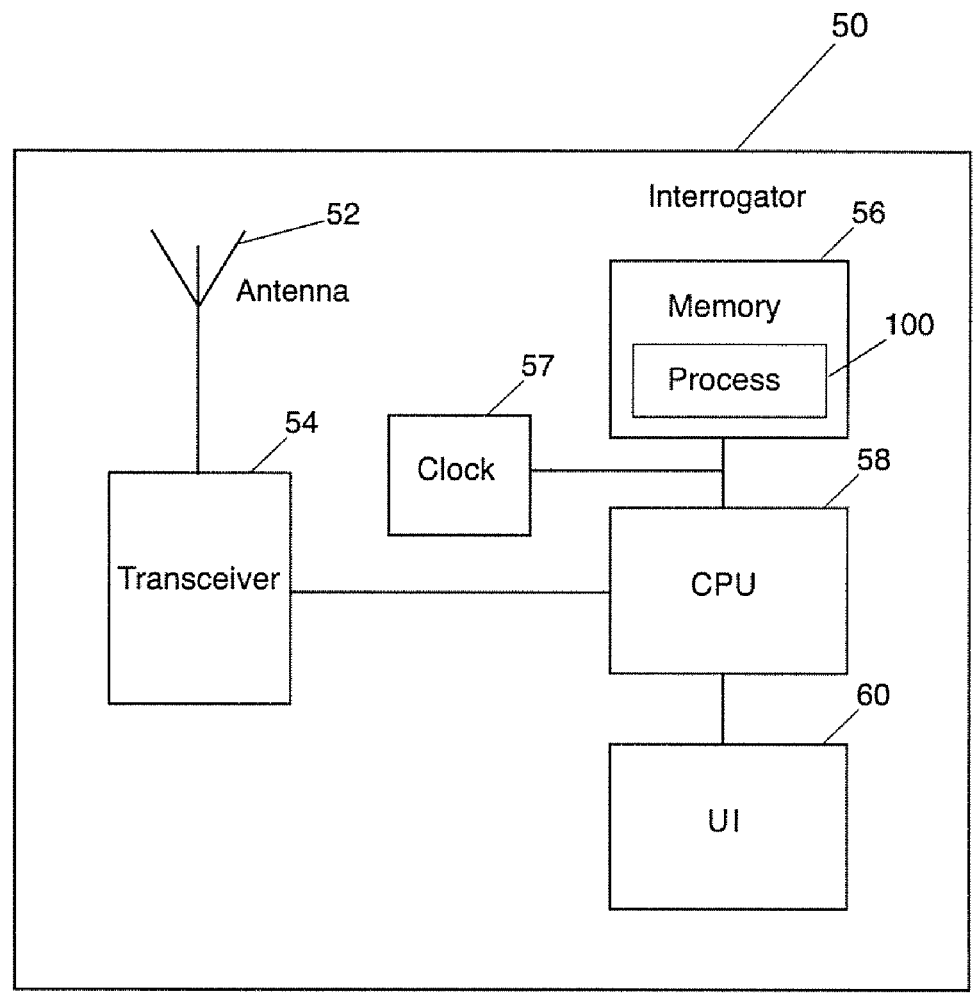
FIG. 2 is a block diagram of an exemplary RFID interrogator.

As shown in FIG. 2, an exemplary interrogator 50 includes an antenna 52, transceiver 54, memory 56, clock 57, central processing unit (CPU) 58 and optional user interface (UI) 60. The RFID interrogator 50 performs Time Division Multiplexing (TDM) with the transceiver 54 and antenna 52. Data (e.g., time and temperature) downloaded from the RFID label 10 can be stored in memory 56.

The RFID interrogator 50 can be used to program the data detecting device (e.g., temperature sensor 20) of the RFID label 10 to record or log a time and temperature in memory 18 at one or more selected times. At a selected time the temperature sensor 20 of the RFID label 10 records a temperature and a time of the temperature recordation in memory 18. The RFID interrogator 50 can download the recorded time and temperature from memory 18 to memory 56.

When the RFID label 10 is initialized by the RFID interrogator 50, the time in the clock 17 in the RFID label 10 (i.e., referred to as label start time) is set to time in the clock 57 in the RFID interrogator 50 (i.e., referred to as actual start time). However, over a period of service, the time maintained in the clock 17 of the RFID label 10 can drift from the actual time maintained in the clock 57 of the RFID interrogator 50. At the time the RFID interrogator 50 downloads the data from the RFID label 10, the actual time in the RFID interrogator 50 is referred to as the actual stop time and the time in the label 10 referred to as the label stop time. And at the time the RFID interrogator 50 downloads the data from the label 10, the interrogator 50 acquires the label stop time from the clock 17 in the RFID label 10. If the actual stop time does not equal the label stop time, the time in the label 10 has drifted and the time at which the label 10 logged the temperature (referred to label time) is suspect. Using the label time, actual stop time, actual start time, label stop time and label start time, the RFID interrogator 50 can compensate/adjust the label time to a time at which the label 10 actually recorded the data (referred to as actual time).

More specifically, memory 56 includes a synch process 100. Synch process 100 compensates for any drift of time in the RFID label 10 and the actual time as found in the RFID interrogator 50 at the time the data is downloaded from the RFID label 10.

As described above, at initialization, the RFID interrogator 50 sends the RFID label 10 a time, so both the interrogator 50 and the label 10 have identical times. The RFID interrogator 50 loads the RFID label 10 with a time (e.g., two hours after start) at which the RFID label 10 is to store/log data, e.g. temperature and time, in its memory 18. At a subsequent interrogation of the label 10 by the interrogator 50, the interrogator 50 knows the label time, the actual stop time, the actual start time, the label stop time and the label start time. From these times, synch process 100 calculates an actual time, i.e., the actual time at which the label 10 recorded the data.

Figure 3:
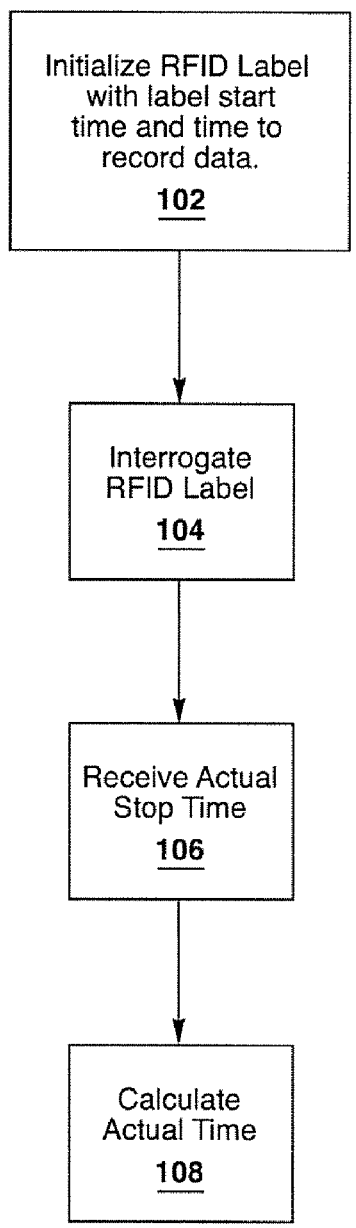
FIG. 3 is a flow diagram of a synch process.

As shown in FIG. 3, synch process 100 includes initializing (102) a RFID label with a label start time, which is the actual start time indicated by a clock in the interrogator, and a time to record data. Process 100 subsequently interrogates and receives (104) a label stop time, a recorded label time and recorded data from the RFID label. The label stop time is the time indicated by the label clock at the time of interrogation. The label time is the time the label indicates it recorded the data.

Process 100 receives (106) the actual stop time from the clock in the RFID interrogator. Process 100 calculates (108) an actual time at which the label recorded the data using the following:

The actual time equals[label time*(actual stop time−actual start time)]/(label stop time−label start time).

For example, if the label start time and the interrogator actual start time are 0000 hours, the label time 0200 hours, the label stop time 1200 hours and the interrogator stop time 0600, the label thinks 12 hours (1200 hours−0000 hours) elapsed between the start and finish. However, the interrogator knows that only 6 hours elapsed between the start and finish (0600 hours−0000 hours). In this example, the time in the label is fast compared to the actual time as indicated in the interrogator. Therefore, the label's clock has drifted, and is fast. Accordingly, the label time, i.e., the time the label thinks it recorded the data, is wrong. Synch process 100 calculates the actual time the data was recorded by the label as [200*(0600−0000)]/(1200−000), i.e., 0100 hours.

In another example, if the label start time and the interrogator actual start time are 0000 hours, the label time 0200 hours, the label stop time 0600 hours and the interrogator atop time 1200, the label thinks 6 hours (0600 hours−0000 hours) elapsed between the start and finish. However, the interrogator knows that 12 hours elapsed between the start and finish (1200 hours−0000 hours). In this example, the time in the label is slow compared to the actual time as indicated in the interrogator. Therefore, the label's clock has drifted, and is slow. Accordingly, the label time, i.e., the time the label thinks it recorded the data, is wrong. Synch process 100 calculates the actual time the data was recorded by the label as [200*(1200−0000)]/(0200−000), i.e., 0400 hours.

As shown above, the synch process 100 can compensate for any variation in time in the label by knowing the label time, actual stop time, actual start time, label stop time and label start time.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed:

1. A method comprising:
in a radio frequency identification (RFID) interrogator having an antenna, transceiver, a clock, a memory and a central processing unit (CPU), initializing a RFID tag with a label start time and a time to record data, the label start time representing an actual start time indicated by the clock;
receiving a label stop time, a label time and logged data from an interrogation of the RFID tag; and
compensating the label time for a drift between the label stop time and an actual stop time by determining an actual time associated with the logged data, wherein determining the actual time comprises:
determining a product of the label time and a difference between the actual stop time and the actual start time; and
determining a quotient of the product and a difference between the label stop time and label start time.

2. The method of claim 1 wherein the data is a temperature.

3. The method of claim 1 wherein the data is a humidity.

4. The method of claim 1 wherein the data is a pressure.

5. The method of claim 1 further comprising:
receiving a subsequent label stop time, a subsequent label time and subsequent logged data from a subsequent interrogation of the RFID tag; and
compensating the subsequent label time for a drift between the subsequent label stop time and the actual stop time.

6. The method of claim 1 further comprising:
receiving additional label times and logged data from the interrogation of the RFID tag; and
compensating each of the additional label times for a drift between the label stop time and an actual stop time.

7. A computer program product, tangibly embodied in a machine readable storage device, for adjusting a time in a radio frequency identification (RFID) system, the computer program product being operable to cause a data processing apparatus to:
in a radio frequency identification (RFID) interrogator having an antenna, transceiver, a clock, a memory and a central processing unit (CPU), initialize a RFID tag with a label start time and a time to record data, the label start time representing an actual start time indicated by the clock;
receive a label stop time, a label time and logged data from an interrogation of the RFID tag; and
compensate the label time for a drift between the label stop time and an actual stop time by determining an actual time associated with the logged data,
wherein the computer program product is further operable to cause the data processing apparatus to determine the actual time by:
determining a product of the label time and a difference between the actual stop time and the actual start time; and
determining a quotient of the product and a difference between the label stop time and label start time.

8. The computer program product of claim 7 wherein the data is a temperature.

9. The computer program product of claim 7 wherein the data is a humidity.

10. The computer program product of claim 7 wherein the data is a pressure.

11. The computer program product of claim 7 further being further operable to cause the data processing apparatus to:
receive a subsequent label stop time, a subsequent label time and subsequent logged data from a subsequent interrogation of the RFID tag; and
compensate the subsequent label time for a drift between the subsequent label stop time and the actual stop time.

12. A radio frequency identification (RFID) interrogator comprising:
an antenna linked to a transceiver; and
a programmable memory and central processing unit linked to the transceiver, wherein the memory is programmed to adjust times in an interrogated RFID label in which data including time is logged, the programmed memory causing the central processing unit to:
initialize a RFID tag with a label start time and a time to record data, the label start time representing an actual start time indicated by the clock;
receive a label stop time, a label time and logged data from an interrogation of the RFID tag; and
compensate the label time for a drift between the label stop time and an actual stop time by determining an actual time associated with the logged data, wherein determining the actual time comprises:
determining a product of the label time and a difference between the actual stop time and the actual start time; and
determining a quotient of the product and a difference between the label stop time and label start time.

13. The RFID interrogator of claim 12 wherein the data is a temperature.

14. The RFID interrogator of claim 12 wherein the data is a humidity.

15. The RFID interrogator of claim 12 wherein the data is a pressure.

16. The RFID interrogator of claim 12 wherein the programming further comprises:
receiving a subsequent label stop time, a subsequent label time and subsequent logged data from a subsequent interrogation of the RFID tag; and
compensating the subsequent label time for a drift between the subsequent label stop time and the actual stop time.

17. The RFID interrogator of claim 12 wherein the programming further comprises:
receiving additional label times and logged data from the interrogation of the RFID tag; and
compensating each of the additional label times for a drift between the label stop time and an actual stop time.

* * * * *